US011272036B2

United States Patent
Li

(10) Patent No.: US 11,272,036 B2
(45) Date of Patent: Mar. 8, 2022

(54) API HYBRID MULTI-TENANT ROUTING METHOD AND SYSTEM, AND API GATEWAY

(71) Applicant: Huawei Technologies Co., Ltd., Shenzhen (CN)

(72) Inventor: Linfeng Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/831,314

(22) Filed: Mar. 26, 2020

(65) Prior Publication Data

US 2020/0228629 A1  Jul. 16, 2020

Related U.S. Application Data

(63) Continuation of application No. PCT/CN2018/099362, filed on Aug. 8, 2018.

(51) Int. Cl.
| | | |
|---|---|---|
| *H04L 29/08* | (2006.01) | |
| *G06F 9/54* | (2006.01) | |
| *H04L 12/24* | (2006.01) | |
| *H04L 12/725* | (2013.01) | |
| *H04M 7/00* | (2006.01) | |
| *H04L 67/63* | (2022.01) | |
| *H04L 67/1001* | (2022.01) | |

(Continued)

(52) U.S. Cl.
CPC ............ *H04L 67/327* (2013.01); *G06F 9/541* (2013.01); *H04L 67/1002* (2013.01); *H04L 41/5022* (2013.01); *H04L 41/5096* (2013.01)

(58) Field of Classification Search
CPC ............... H04L 67/327; H04L 67/1002; H04L 41/5022; H04L 41/506; G06F 9/541
USPC ........................................................ 709/201
See application file for complete search history.

(56) References Cited

U.S. PATENT DOCUMENTS

| | | | |
|---|---|---|---|
| 8,601,000 B1 | 12/2013 | Stefani et al. | |
| 2011/0274258 A1* | 11/2011 | Casalaina | H04M 7/0057 379/93.01 |

(Continued)

FOREIGN PATENT DOCUMENTS

| | | |
|---|---|---|
| CN | 102281330 A | 12/2011 |
| CN | 102708316 A | 10/2012 |

(Continued)

*Primary Examiner* — Umar Cheema
*Assistant Examiner* — Tony Williams
(74) *Attorney, Agent, or Firm* — Leydig, Voit & Mayer, Ltd.

(57) ABSTRACT

Embodiments of this application provide an API hybrid multi-tenant routing method and system, as well as an API gateway. The method includes: after receiving an API request message sent by an API caller, obtaining an APP key carried in the message; obtaining, based on a multi-tenant routing policy table, an API running instance URL list corresponding to the APP key; determining an API running instance URL in the API running instance URL list; and returning the API running instance URL to the API caller. The APP key is used to identify the API caller. The multi-tenant routing policy table stores a mapping relationship between the APP key and the API running instance URL list. The API hybrid multi-tenant routing system is a functional module in the API gateway.

3 Claims, 7 Drawing Sheets

(51) Int. Cl.
*H04L 41/5022* (2022.01)
*H04L 41/50* (2022.01)

(56) References Cited

U.S. PATENT DOCUMENTS

| | | | |
|---|---|---|---|
| 2012/0207156 A1* | 8/2012 | Srinivasan | H04L 45/7457 370/389 |
| 2015/0319185 A1* | 11/2015 | Kirti | H04L 67/306 726/23 |
| 2015/0358399 A1 | 12/2015 | Baugher et al. | |
| 2015/0372937 A1 | 12/2015 | Lai et al. | |
| 2016/0028855 A1* | 1/2016 | Goyal | H04L 43/10 709/203 |
| 2016/0080285 A1 | 3/2016 | Ramachandran et al. | |
| 2016/0105393 A1 | 4/2016 | Thakkar et al. | |
| 2016/0127454 A1* | 5/2016 | Maheshwari | H04L 41/0803 709/223 |
| 2017/0012941 A1* | 1/2017 | Subbarayan | H04L 41/0813 |
| 2017/0048252 A1* | 2/2017 | Straub | H04L 67/06 |
| 2017/0064038 A1* | 3/2017 | Chen | G06F 16/951 |
| 2017/0163480 A1* | 6/2017 | Vergara | H04L 67/02 |
| 2017/0228417 A1* | 8/2017 | Maccanti | G06F 11/1469 |

FOREIGN PATENT DOCUMENTS

| | | |
|---|---|---|
| CN | 106462466 A | 2/2017 |
| CN | 106464534 A | 2/2017 |

\* cited by examiner

API HYBRID MULTI-TENANT ROUTING METHOD AND SYSTEM, AND API GATEWAY

CROSS-REFERENCE TO RELATED APPLICATIONS

This application is a continuation of International Application No. PCT/CN2018/099362, filed on Aug. 8, 2018, which claims priority to Chinese Patent Application No. 201710883549.3, filed on Sep. 26, 2017. The disclosures of the aforementioned applications are hereby incorporated by reference in their entireties.

TECHNICAL FIELD

This application relates to the field of software technologies, and in particular, to an API hybrid multi-tenant routing method and system, and an API gateway.

BACKGROUND

After an API (Application Programming Interface) gateway is implemented in an SaaS (software-as-a-service) mode, the API gateway may provide internal data or an internal program of a platform, a system, or the like for a third-party API tenant through a RESTful (Representational State Transfer) API, so that the API tenant can integrate different API services into an application of the API tenant, and a new service is derived. This is beneficial to promoting ecological development and cross-industry innovation of technologies.

Different API tenants have different requirements on an API resource, security, and the like, and therefore, different API SLA (Service-Level Agreement) policies are derived. To meet the SLA policies of the different API tenants, the API gateway needs to externally provide API services by using different solutions. Currently, there are two types of tenants of the API gateway: a physical tenant and a logical tenant. Accordingly, multi-tenant (a plurality of physical tenants or a plurality of logical tenants) solutions used are also different.

In a physical multi-tenant solution, APIs of tenants are physically isolated by using, for example, a Docker container, a VM (Virtual Machine, virtual machine), or a physical machine. A principle of the physical multi-tenant solution is shown in FIG. 1. Each tenant corresponds to one or more API running instances in the API gateway. These API running instances constitute an API cluster exclusive to a tenant (such as a tenant A). For example, in FIG. 1, the tenant A corresponds to an API cluster 1, a tenant B corresponds to an API cluster 2, and so on. For API clusters of different tenants, externally provided API running instance URLs carry tenant IDs, and the tenant IDs are used to distinguish between the API running instance URLs of the different tenants. For example, an API running instance URL of the tenant A is: http://xxx.apigatewa/tenantA/order, and an API running instance URL of the tenant B is: http://xxx.apigatewa/tenantB/order. Because a physical resource exclusive-mode is used, the tenants have their own private API running instance URLs, and these URLs do not conflict. In the physical multi-tenant solution, after an application of each tenant requests a resource from the API gateway based on a tenant ID, the API gateway returns an API running instance URL of the tenant, and the application directly accesses the returned API running instance URL to obtain a resource. Therefore, multi-tenant routing is not required.

In a logical multi-tenant solution, all tenants share one or more API running instances, and API isolation between the different tenants is implemented in each API running instance through multithreading, isolation of coroutines, or isolation of message queues. A principle of the logical multi-tenant solution is shown in FIG. 2. Various tenants share one or more API running instances, and an API cluster externally provides only one running instance URL. For example, an API running instance URL provided for all the tenants is: http://xxx.apigatewa/order?ID=1. Because all the tenants share the same API running instances, the API running instances are totally equivalent to each other. Therefore, in the logical multi-tenant solution, after an application of a tenant requests an API resource from the API gateway based on a tenant ID, the API gateway can route an API running instance to the application of the tenant by performing only random or polling distribution.

The physical multi-tenant solution has problems such as high resource occupation and high maintenance costs, and the logical multi-tenant solution has a problem such as poor fault isolation. Considering both resource conservation and fault isolation improvement, it is necessary to propose a hybrid multi-tenant solution. In the hybrid multi-tenant solution, the physical multi-tenant solution may be used for an important tenant, and the logical multi-tenant solution may be used for an ordinary tenant. In a hybrid multi-tenant scenario, some API running instances are exclusive to a single physical tenant, and some API running instances are shared by a plurality of logical tenants. How to correctly route an API running instance to an application of a tenant is a main problem that needs to be resolved for implementing the hybrid multi-tenant solution.

SUMMARY

This application provides an API hybrid multi-tenant routing method and system, and an API gateway, to implement API hybrid multi-tenant routing.

According to a first aspect, this application provides an API hybrid multi-tenant routing method. The method includes: receiving, by an API gateway, an API request message sent by an API caller, where the API request message carries an application key APP key, and the APP key is used to identify the API caller; obtaining the APP key based on the API request message; obtaining, based on the APP key and a multi-tenant routing policy table, an API running instance URL list corresponding to the APP key, where the multi-tenant routing policy table is used to store a mapping relationship between the APP key and the API running instance URL list, an API running instance corresponding to the API running instance URL list is configured by the API gateway based on information about an API tenant, and the API caller belongs to the API tenant; determining, in the API running instance URL list based on a preconfigured API load balancing policy, an API running instance URL corresponding to the API request message; and returning the API running instance URL to the API caller. According to this implementation, if the tenant to which the API caller belongs is a physical tenant, a private API running instance URL of the tenant is returned to the API caller; or if the tenant to which the API caller belongs is a logical tenant, a shared API running instance URL allocated to the tenant is returned to the API caller. In this way, the API caller can call a correct API running instance by sending the API request message carrying the APP key without a need of tenant information, thereby implementing adaptive hybrid multi-tenant routing.

With reference to the first aspect, in a first possible implementation of the first aspect, before the receiving, by an API gateway, an API request message sent by an API caller, the method further includes: generating the APP key based on information about the API caller, and returning the APP key to the API caller; and generating the multi-tenant routing policy table. The API gateway generates the APP key for one time before the API caller requests an API running instance resource for the first time, and the API gateway returns the APP key to the API caller for storage. When requesting an API running instance resource each time, the API caller sends, to the API gateway, a request message carrying the APP key, and does not need to obtain the tenant information. The API gateway generates in advance the multi-tenant routing policy table that stores the mapping relationship between the APP key and the API running instance URL list, and after receiving the request message sent by the API caller, the API gateway may directly determine, based on the APP key in the request message and the multi-tenant routing policy table, the API running instance URL routed to the API caller.

With reference to the first possible implementation of the first aspect, in a second possible implementation of the first aspect, in the method, the generating the multi-tenant routing policy table includes: obtaining a tenant ID of the API tenant based on the APP key, and generating a first mapping table between the APP key and the tenant ID; obtaining the API running instance URL list based on the tenant ID, and generating a second mapping table between the tenant ID and the API running instance URL list; and generating the multi-tenant routing policy table based on the first mapping table and the second mapping table. There is no direct mapping relationship between the APP key and the API running instance URL list, a direct mapping relationship between the APP key and the tenant ID is easy to obtain, and a direct mapping relationship between the tenant ID and the API running instance URL list is also easy to obtain. Therefore, the first mapping table and the second mapping table are first generated and stored. This is beneficial to generating the multi-tenant routing policy table more conveniently, and is also beneficial to updating the multi-tenant routing policy table when an API running instance URL list corresponding to a tenant changes.

With reference to the second possible implementation of the first aspect, in a third possible implementation of the first aspect, the obtaining a tenant ID of the API tenant based on the APP key includes: obtaining the information about the corresponding API caller from an identity and access management (IAM) module based on the APP key; and determining, based on the information about the API caller, the API tenant to which the API caller belongs, and obtaining the tenant ID of the API tenant. The APP key is generated based on the information about the API caller. If the information about the API caller includes related identification information of the tenant ID, a correspondence between the APP key and the tenant ID can be directly obtained. If the information about the API caller includes only a correspondence with the tenant or belonging information related to the tenant, the tenant to which the API caller belongs is first determined based on the information about the API caller, and then the tenant ID is obtained, so that a correct correspondence between the APP key and the tenant ID can be obtained.

According to a second aspect, this application provides an API hybrid multi-tenant routing system. The system includes a multi-tenant routing module. The multi-tenant routing module is configured to: receive an API request message sent by an API consumer, where the API request message carries an APP key, and the APP key is used to identify an identity of the API consumer; obtain the APP key based on the API request message; obtain, based on the APP key and a multi-tenant routing policy table, an API running instance URL list corresponding to the APP key, where the multi-tenant routing policy table is used to store a mapping relationship between the APP key and the API running instance URL list, an API running instance corresponding to the API running instance URL list is configured by an API gateway based on information about an API tenant, and the API consumer belongs to the API tenant; determine, in the API running instance URL list based on a preconfigured API load balancing policy, an API running instance URL corresponding to the API request message; and return the API running instance URL to the API consumer.

With reference to the second aspect, in a first possible implementation of the second aspect, the system further includes a tenant module. The tenant module is configured to generate the APP key based on information about the API consumer, and return the APP key to the API consumer. The multi-tenant routing module is further configured to generate the multi-tenant routing policy table.

With reference to the first possible implementation of the second aspect, in a second possible implementation of the second aspect, the system further includes a tenant management module. The tenant management module is configured to: obtain a tenant ID of the API tenant based on the APP key, and generate a first mapping table between the APP key and the tenant ID; and obtain the API running instance URL list based on the tenant ID, and generate a second mapping table between the tenant ID and the API running instance URL list. The multi-tenant routing module is further configured to generate the multi-tenant routing policy table based on the first mapping table and the second mapping table.

With reference to the second possible implementation of the second aspect, in a third possible implementation of the second aspect, the tenant management module is specifically configured to: obtain the information about the corresponding API consumer from an identity and access management (IAM) module based on the APP key; and determine, based on the information about the API consumer, the API tenant to which the API consumer belongs, and obtain the tenant ID of the API tenant.

According to a third aspect, an embodiment of this application provides another API hybrid multi-tenant routing system. The system includes: a receiving module, configured to receive an API request message sent by an API caller, where the API request message carries an APP key, and the APP key is used to identify the API caller; a parsing module, configured to obtain the APP key based on the API request message; and a routing module, configured to: obtain, based on the APP key and a multi-tenant routing policy table, an API running instance URL list corresponding to the APP key, where the multi-tenant routing policy table is used to store a mapping relationship between the APP key and the API running instance URL list, an API running instance corresponding to the API running instance URL list is configured by an API gateway based on information about an API tenant, and the API caller belongs to the API tenant; determine, in the API running instance URL list based on a preconfigured API load balancing policy, an API running instance URL corresponding to the API request message; and return the API running instance URL to the API caller.

With reference to the third aspect, in a first possible implementation of the third aspect, the system further includes: an APP key generation module, configured to generate the APP key based on information about the API caller, and return the APP key to the API caller; and a multi-tenant routing policy table generation module, configured to generate the multi-tenant routing policy table.

With reference to the first possible implementation of the third aspect, in a second possible implementation of the third aspect, the multi-tenant routing policy table generation module is specifically configured to: obtain a tenant ID of the API tenant based on the APP key, and generate a first mapping table between the APP key and the tenant ID; obtain the API running instance URL list based on the tenant ID, and generate a second mapping table between the tenant ID and the API running instance URL list; and generate the multi-tenant routing policy table based on the first mapping table and the second mapping table.

With reference to the second possible implementation of the third aspect, in a third possible implementation of the third aspect, the multi-tenant routing policy table generation module is specifically configured to: obtain the information about the corresponding API caller from an identity and access management (IAM) module based on the APP key; and determine, based on the information about the API caller, the API tenant to which the API caller belongs, and obtain the tenant ID of the API tenant.

According to a fourth aspect, an embodiment of this application further provides an API gateway. The API gateway includes a memory, a receiver, a transmitter, and a processor. The receiver is configured to receive an API request message sent by an API caller, where the API request message carries an APP key, and the APP key is used to identify the API caller. The processor executes code stored in the memory to: obtain the APP key based on the API request message; obtain, based on the APP key and a multi-tenant routing policy table, an API running instance URL list corresponding to the APP key, where the multi-tenant routing policy table is stored in the memory, and is used to store a mapping relationship between the APP key and the API running instance URL list, an API running instance corresponding to the API running instance URL list is configured by the processor based on information about an API tenant, and the API caller belongs to the API tenant; and determine, in the API running instance URL list based on a preconfigured API load balancing policy, an API running instance URL corresponding to the API request message. The transmitter is configured to return the API running instance URL to the API caller.

With reference to the fourth aspect, in a first possible implementation of the fourth aspect, the processor is further configured to: generate the APP key based on information about the API caller, and return the APP key to the API caller; and generate the multi-tenant routing policy table and store the multi-tenant routing policy table in the memory.

With reference to the first possible implementation of the fourth aspect, in a second possible implementation of the fourth aspect, the processor is specifically configured to: obtain a corresponding tenant ID based on the APP key, generate a first mapping table between the APP key and the tenant ID, and store the first mapping table in the memory; obtain the API running instance URL list based on the tenant ID, generate a second mapping table between the tenant ID and the API running instance URL list, and store the second mapping table in the memory; and generate the multi-tenant routing policy table based on the first mapping table and the second mapping table.

With reference to the second possible implementation of the fourth aspect, in a third possible implementation of the fourth aspect, the processor is specifically configured to: obtain the information about the corresponding API caller from an identity and access management (IAM) module based on the APP key; and determine, based on the information about the API caller, the API tenant to which the API caller belongs, and obtain the tenant ID of the API tenant.

According to a fifth aspect, an embodiment of this application further provides a computer readable storage medium, including an instruction. When the instruction is run on a computer, the computer is enabled to perform the method in the first aspect.

According to a sixth aspect, an embodiment of this application further provides a computer program product including an instruction. When the computer program product is run on a computer, the computer is enabled to perform the method in the first aspect.

In the API hybrid multi-tenant routing technical solution provided in the embodiments of this application, after the API request message sent by the API caller is received, the application key (APP key: Application Key) carried in the API request message is obtained through parsing; then the API running instance URL list corresponding to the APP key is obtained based on the multi-tenant routing policy table; and finally the API running instance URL is determined in the API running instance URL list, and is returned to the API caller. The API caller calls a specific API running instance corresponding to the API running instance URL. In this way, routing of the API running instance to the API caller is completed. The APP key is used to identify the API caller. The multi-tenant routing policy table is used to store the mapping relationship between the APP key and the API running instance URL list. The API running instance corresponding to the API running instance URL is configured by the API gateway based on the information about the tenant, and the API caller belongs to the tenant. If the tenant to which the API caller belongs is a physical tenant, a private API running instance URL of the tenant is returned to the API caller; or if the tenant to which the API caller belongs is a logical tenant, a shared API running instance URL allocated to the tenant is returned to the API caller. In this way, the API caller can call a correct API running instance by sending the API request message carrying the APP key without a need of obtaining tenant information, thereby implementing adaptive hybrid multi-tenant routing.

DESCRIPTION OF EMBODIMENTS

Figure 1:
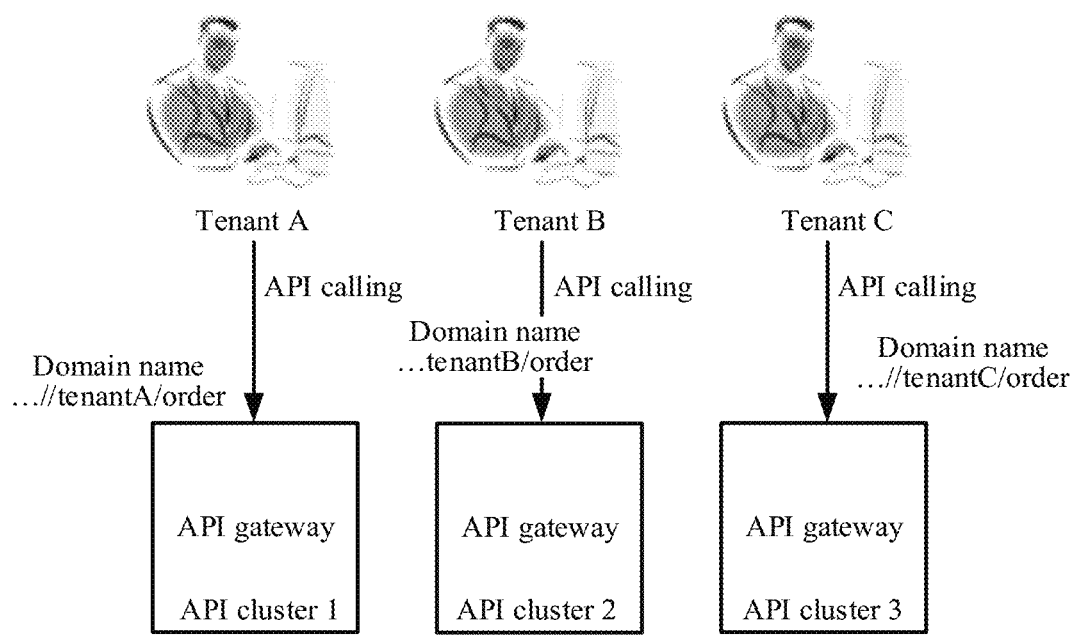
FIG. 1 is a schematic diagram of a physical multi-tenant solution in the prior art.
Figure 2:
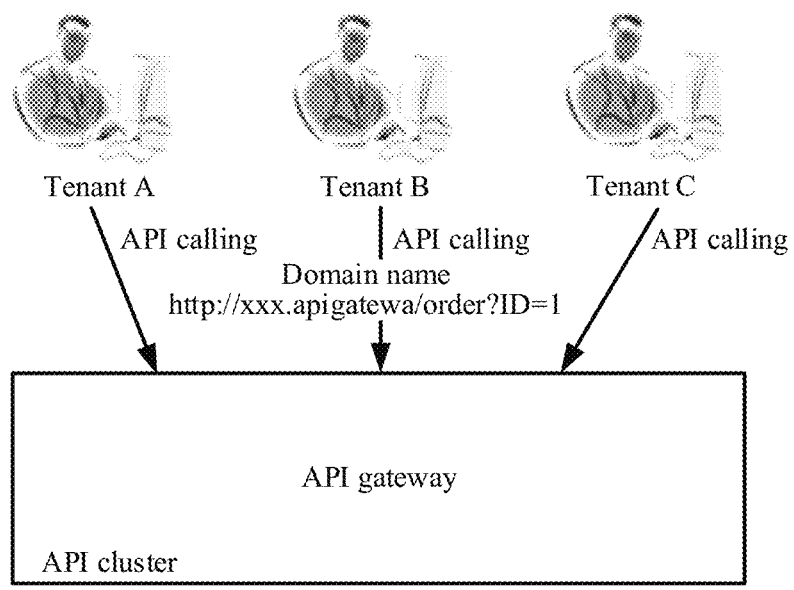
FIG. 2 is a schematic diagram of a logical multi-tenant solution in the prior art.

In a hybrid multi-tenant routing solution provided in embodiments of this application, when a tenant purchases an API by using an API gateway, the tenant determines a tenant type (a physical tenant or a logical tenant), and then signs an SLA protocol to complete the API purchasing. After the purchasing succeeds, the API gateway creates an account for the tenant, generates a tenant ID, and stores tenant information, such as the tenant ID, the tenant type corresponding to the tenant ID, and information about an API caller belonging to the tenant, in an IAM (Identity and Access Management). The tenant ID corresponds to the tenant type, and the tenant type can be determined based on the tenant ID. The tenant ID also corresponds to the information about the API caller. In an implementation, a specific symbol may be set in the tenant ID to identify the tenant type. In this way, the API gateway may directly determine the tenant type based on the tenant ID. In another implementation, the tenant type is used as a tenant attribute corresponding to the tenant ID, and the API gateway can obtain the tenant type based on the tenant ID and then determine the tenant type in this way. The IAM may be a part of the API gateway, or may be an independent apparatus independent of the API gateway. The API caller belongs to the tenant, and is a user of an API running instance of the tenant. The API caller may be specifically a client, an application, or the like that needs to call the API running instance. The API running instance is configured by the API gateway based on information about the tenant. If the tenant type is a physical tenant, the configuration is specifically deploying a new API running instance private to the tenant. If the tenant type is a logical tenant, the configuration is specifically allocating an existing shared API running instance. Each API running instance has one API running instance URL. After API running instances are configured, the API gateway accordingly generates an API running instance URL list for storing URLs of the configured API running instances. In addition, the API running instance URL list corresponds to the tenant ID of the tenant, and the API running instance URL list may be stored in the IAM or another storage module.

In the technical solution provided in the embodiments of this application, when needing to call an API running instance, the API caller sends a request message to the API gateway, to request a resource of the API running instance from the API gateway. The request message carries an APP key, the APP key is used to identify the API caller, and the APP key may be stored in an application. The API gateway receives the request message sent by the API caller, parses the request message to obtain the APP key, determines, based on the APP key, the tenant ID of the tenant to which the API caller belongs, and returns the API running instance URL corresponding to the tenant ID to the API caller, so that the API caller calls the API running instance.

Figure 3A:
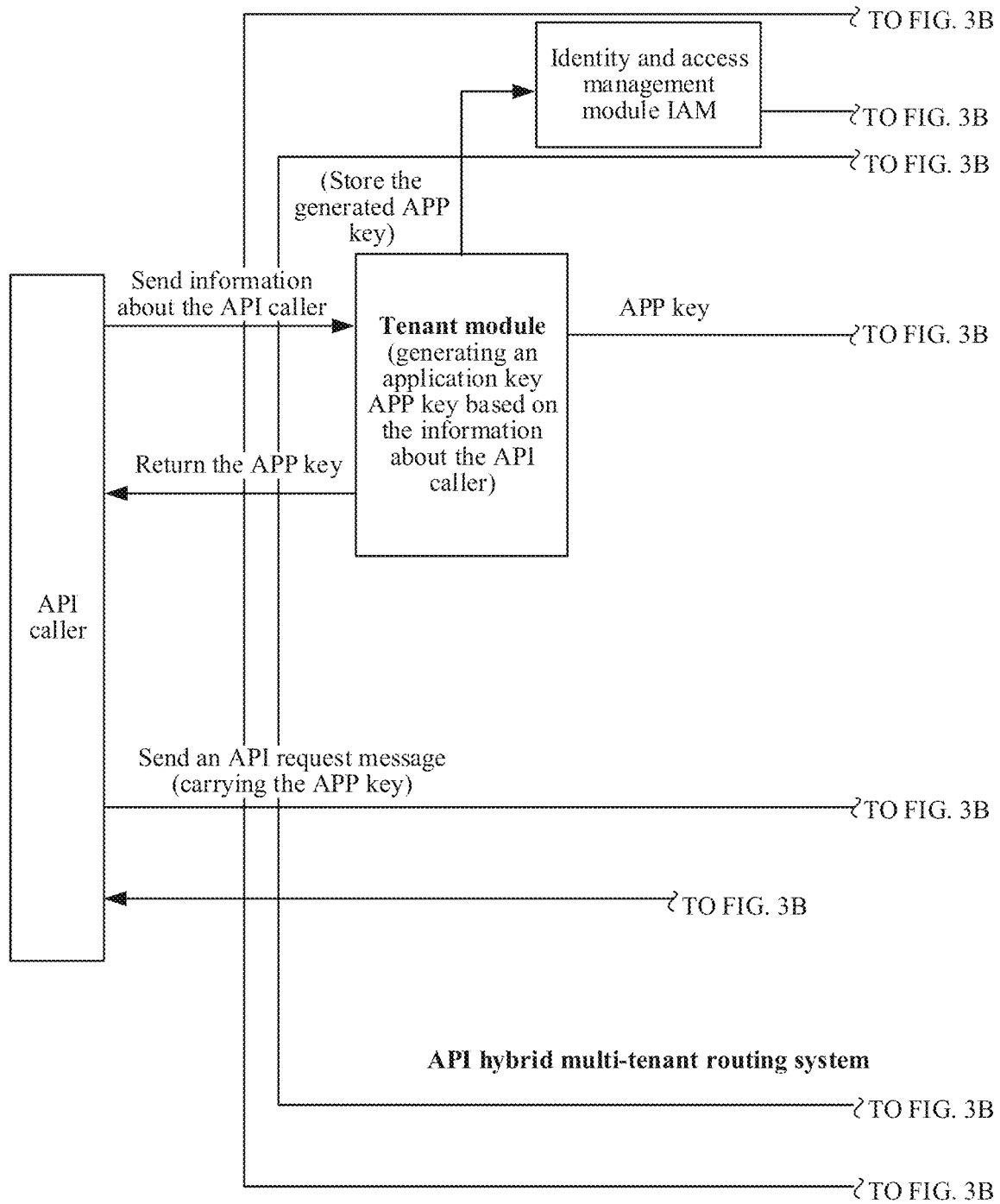
FIG. 3A and FIG. 3B are a block diagram of a hybrid multi-tenant routing system according to an embodiment of this application.
Figure 3B:
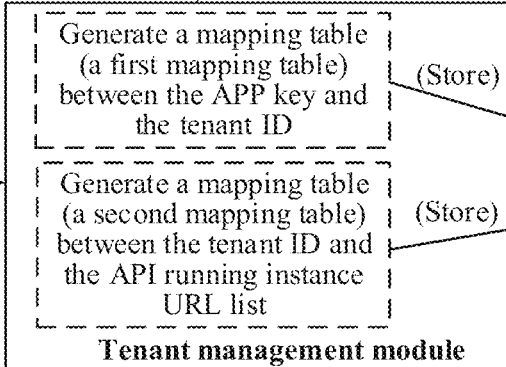
Figure 3B:
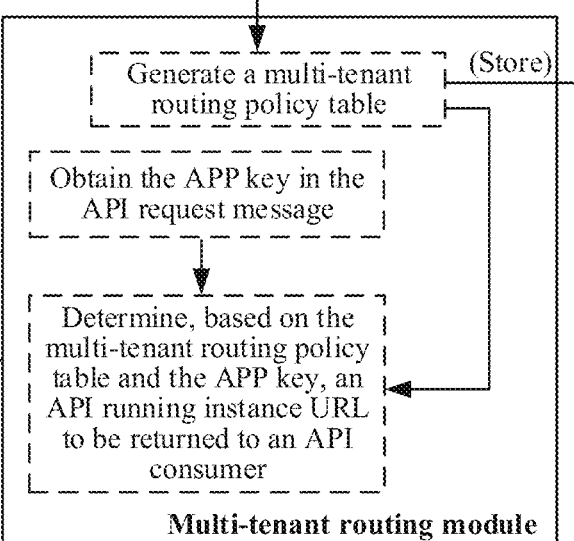

Specifically, an embodiment of this application provides a hybrid multi-tenant routing system. The system is applied to an API gateway. FIG. 3A and FIG. 3B show an implementation of the hybrid multi-tenant routing system according to this embodiment of this application. The system may include a tenant module, a tenant management module, and a multi-tenant routing module. In FIG. 3A and FIG. 3B, an arrow indicates a direction of data flow. The API hybrid multi-tenant routing system provided in this embodiment of this application may further include a database, a memory, and an IAM shown in FIG. 3A and FIG. 3B.

The tenant module may be configured to:
(1) Generate an APP key. Before requesting an API running instance from the API gateway for the first time, an API caller sends information about the API caller to the API gateway, or the information about the API caller is entered into the API gateway through a user interface by a skilled person who manages the API caller. Specifically, the tenant module receives the information about the API caller that is sent by the API caller or entered by the skilled person, generates the APP key based on the information about the API caller, stores the APP key in the IAM, and returns the APP key to the API caller. The APP key is used to identify the API caller. After receiving the APP key, the API caller locally stores the APP key.

Before requesting the API running instance from the API gateway each time, the API caller may transmit the information about the API caller to the API gateway, and the tenant module generates the APP key. However, such repeated and redundant steps waste resources. Therefore, the API caller transmits the information about the API caller to the API gateway before requesting the API running instance from the API gateway for the first time, and the tenant module generates the APP key for one time. After receiving the APP key returned by the tenant module, the API caller does not need to transmit the information about the API caller to the API gateway, and sends a request message to the API gateway based on the APP key each time.

(2) After the APP key is generated, generate an API authorization token, based on the APP key, and return the API authorization token to the API caller. After receiving the API authorization token, the API caller locally stores the API authorization token.

The tenant management module may be specifically configured to:
(1) Generate a mapping table between the APP key and a tenant ID. The tenant management module may obtain, through query in the IAM based on the APP key, the information about the API caller corresponding to the APP key; then obtain, through query based on a belonging relationship between the information about the API caller and tenant information, information about a tenant to which the API caller belongs, to obtain the tenant ID; and generate the mapping table between the APP key and the tenant ID. The mapping table between the APP key and the tenant ID may be persistently stored in a storage module, for example, the database.

(2) Generate a mapping table between the tenant ID and an API running instance URL list. The tenant management module obtains, through query, the corresponding API running instance URL list from the IAM or another storage module based on the obtained tenant ID, and generates the mapping table between the tenant ID and the API running instance URL list. The tenant management module may persistently store the mapping table between the tenant ID and the API running instance URL list in the storage module (e.g., the database).

(3) Transmit the generated mapping table (referred to as a first mapping table for ease of description) between the APP key and the tenant ID, and the generated mapping table (referred to as a second mapping table for ease of description) between the tenant ID and the API running instance URL list to the multi-tenant routing module. The multi-tenant routing module may store the foregoing mapping tables in a buffer.

The multi-tenant routing module may be a multi-tenant routing engine, and is specifically configured to:
(1) Receive the mapping table between the APP key and the tenant ID and the mapping table between the tenant ID and the API running instance URL list, where the mapping tables are transmitted by the tenant management module; and generate a multi-tenant routing policy table. The multi-tenant routing module generates the multi-tenant routing policy table based on the first mapping table and the second mapping table. The multi-tenant routing policy table is a mapping table between the APP key and the API running instance URL list. The multi-tenant routing policy table may be in a form of a data table such as a hash table. The multi-tenant routing module may buffer the multi-tenant routing policy table in a memory.

(2) Perform multi-tenant routing. When needing to call an API running instance, the API caller sends an API request message to the API gateway (specifically, a multi-tenant routing module in the API gateway), where the API request message carries the APP key. Specifically, the API caller may add the APP key to an API request message header (for example, an Http Header). After receiving the API request message, the multi-tenant routing module parses the API request message to obtain the APP key; then obtains, through query based on the multi-tenant routing policy table and the obtained APP key, an API running instance URL list corresponding to the APP key; next, determines an API running instance URL in the API running instance URL list based on a preset API load balancing policy (random selection, weight-based selection, polling, or the like); and finally returns the determined API running instance URL to the API caller. The API caller calls an API running instance corresponding to the API running instance URL. In this way, routing of the API running instance to the API caller is completed, thereby implementing adaptive hybrid multi-tenant routing.

In another implementation, the API caller further adds the API authorization token to the API request message. After receiving the API request message, the multi-tenant routing module parses the API request message to obtain the APP key and the API authorization token, and verifies validity of the API authorization token. If the API authorization token is valid, the multi-tenant routing module obtains, through query based on the multi-tenant routing policy table and the obtained APP key, the API running instance URL list corresponding to the APP key. If the API authorization token is invalid, the multi-tenant routing module returns a request failure message to the API caller. Based on the API hybrid multi-tenant routing system provided in this embodiment of this application, when needing to call the API running instance, the API caller does not need to obtain tenant information, and sends, to the API gateway, the request message carrying the APP key, and the API gateway returns the corresponding API running instance URL to the API caller based on the APP key. If the API caller belongs to a physical tenant, the API caller receives an API running instance URL private to the physical tenant. If the API caller belongs to a logical tenant, the API caller receives a shared API running instance URL allocated to the logical tenant. An API consumer can call an API running instance corresponding to the API running instance URL, thereby implementing adaptive hybrid multi-tenant routing when the API caller is not aware of the tenant.

Figure 4:
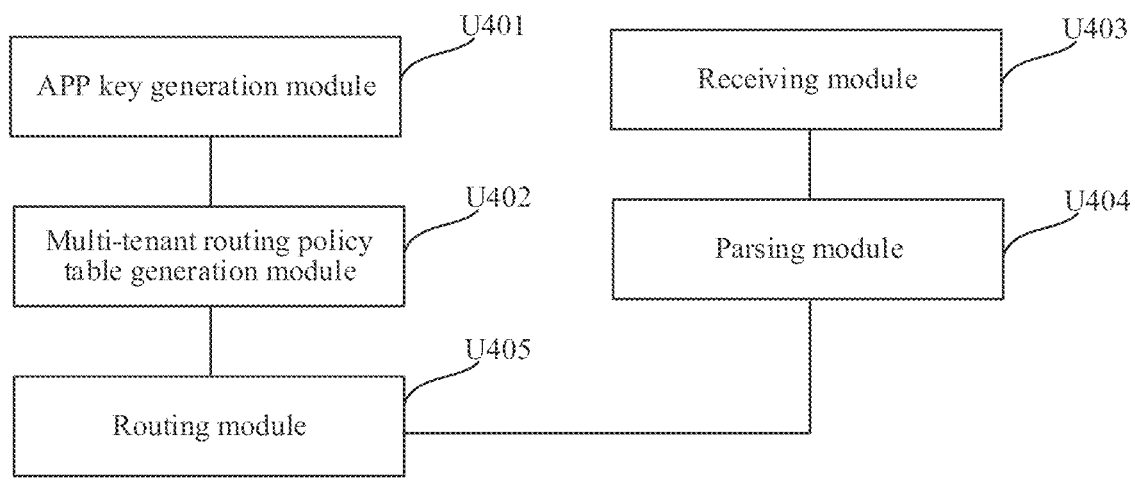
FIG. 4 is a block diagram of another hybrid multi-tenant routing system according to an embodiment of this application.

It should be noted that an implementation of the hybrid multi-tenant routing system is not only limited to the implementation shown in FIG. 3A and FIG. 3B, and the system may be divided in another manner based on the functions implemented by the functional modules. FIG. 4 is another implementation of the API hybrid multi-tenant routing system according to an embodiment of this application. The system includes:

an APP key generation module U401, configured to: receive information about an API caller that is transmitted by the API caller or entered by a skilled person, generate an APP key based on the information about the API caller, store the APP key in an IAM, and return the APP key to the API caller, where the APP key is used to uniquely identify the API caller;

a multi-tenant routing policy table generation module U402, configured to generate a multi-tenant routing policy table, and store the multi-tenant routing policy table in a buffer or a database, where the multi-tenant routing policy table is used to store a mapping relationship between the APP key and an API running instance URL list;

a receiving module U403, configured to receive an API request message sent by the API caller, where the API request message carries the APP key;

a parsing module U404, configured to parse the API request message to obtain the APP key; and a routing module U405, configured to: obtain, based on the APP key and the multi-tenant routing policy table that is generated by the multi-tenant routing policy table generation module, the API running instance URL list corresponding to the APP key; determine, in the API running instance URL list based on a preconfigured API load balancing policy, an API running instance URL corresponding to the API request message; and return the API running instance URL to the API caller.

The multi-tenant routing policy table generation module may be specifically configured to: obtain, through query, a corresponding tenant ID from the IAM based on the APP key, and generate a first mapping table between the APP key and the tenant ID; obtain, through query, the API running instance URL list in the IAM or another storage module based on the tenant ID, and generate a second mapping table between the tenant ID and the API running instance URL list; and generate the multi-tenant routing policy table based on the first mapping table and the second mapping table, where the first mapping table and the second mapping table may be persistently stored in the database.

When obtaining the corresponding tenant ID based on the APP key, the multi-tenant routing policy table generation module may be specifically configured to: obtain the information about the corresponding API caller from the IAM based on the APP key; and determine, from the IAM based on the information about the API caller, a tenant to which the API caller belongs, and obtain the tenant ID of the tenant.

The APP key generation module may be further configured to: generate an API authorization token based on the APP key, and return the API authorization token to the API caller. Correspondingly, the receiving module is configured to receive the API request message sent by the API caller, where the API request message carries the APP key and the API authorization token; the parsing module is configured to parse the API request message to obtain the APP key and the API authorization token; and the routing module U405 is further configured to: verify validity of the APP key, and if the APP key is valid, determine, based on the APP key and the multi-tenant routing policy table, the API running instance URL to be returned to the API caller, and return the API running instance URL to the API caller.

After determining the API running instance URL corresponding to the API request message, the routing module returns the API running instance URL to the API caller. The API caller calls an API running instance corresponding to the API running instance URL. If the API caller belongs to a physical tenant, the API hybrid multi-tenant routing system returns an API running instance URL private to the physical tenant to the API caller. If the API caller belongs to a logical tenant, the API hybrid multi-tenant routing system returns a shared API running instance URL of the logical tenant to the API caller. In this way, the API hybrid multi-tenant routing system provided in this embodiment of this application may adaptively route a correct API running instance URL to the API caller, and the API caller does not need to obtain tenant information.

Figure 5:
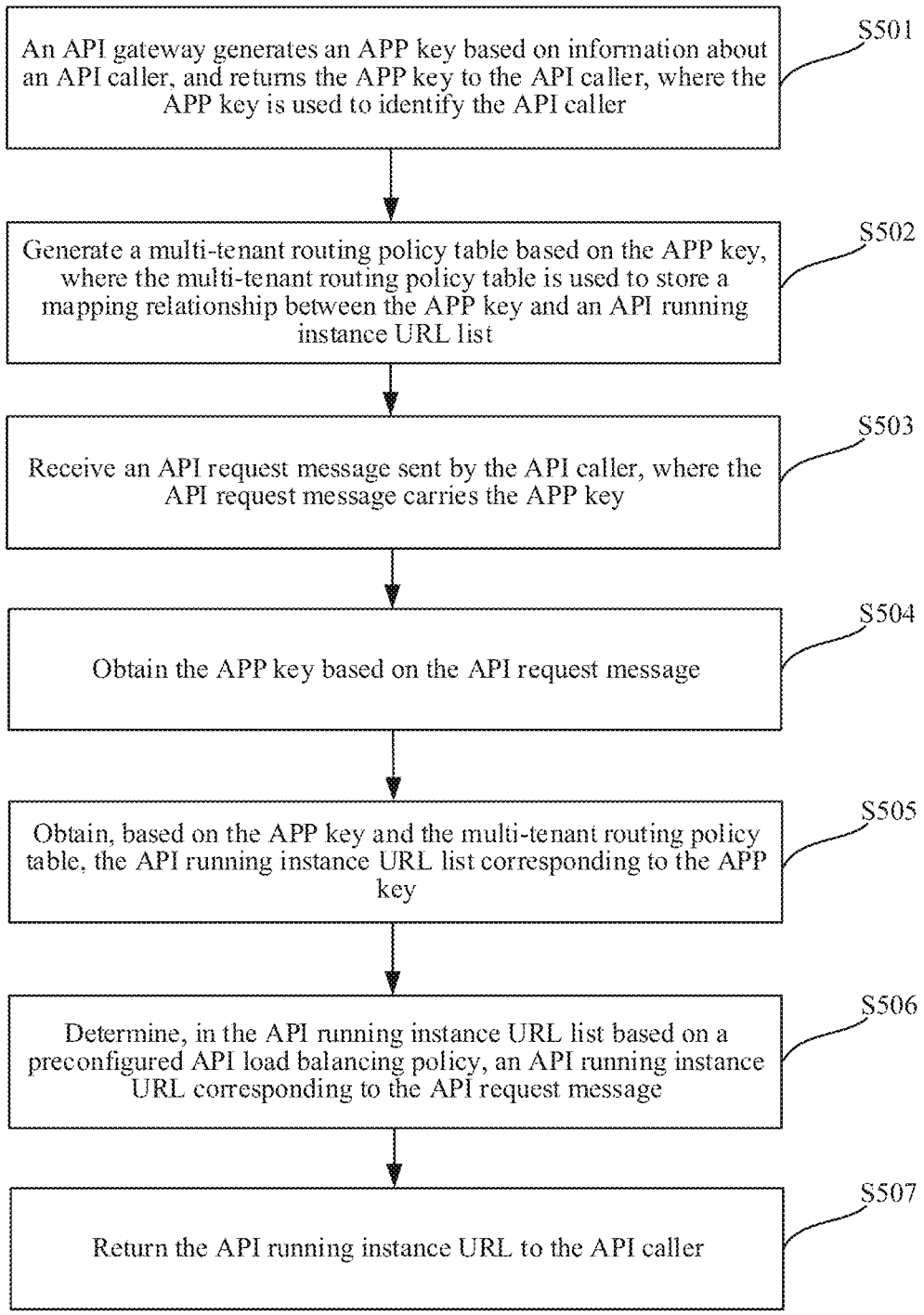
FIG. 5 is a schematic flowchart of a hybrid multi-tenant routing method according to an embodiment of this application.

The API hybrid multi-tenant routing system provided in the embodiments of this application may be configured to implement an API hybrid multi-tenant routing method provided in the embodiments of this application. FIG. 5 shows an API hybrid multi-tenant routing method according to an embodiment of this application. The method is applied to an API gateway, and the method includes the following steps:

Step S501. The API gateway generates an APP key based on information about an API caller, and returns the APP key to the API caller, where the APP key is used to identify the API caller.

Step S502. Generate a multi-tenant routing policy table based on the APP key, where the multi-tenant routing policy table is used to store a mapping relationship between the APP key and an API running instance URL list, an API running instance corresponding to the API running instance URL list is configured by the API gateway based on information about an API tenant, and the API caller belongs to the API tenant.

Step S503. Receive an API request message sent by the API caller, where the API request message carries the APP key.

Step S504. Obtain the APP key based on the API request message.

Step S505. Obtain, based on the APP key and the multi-tenant routing policy table, the API running instance URL list corresponding to the APP key.

Step S506. Determine, in the API running instance URL list based on a preconfigured API load balancing policy, an API running instance URL corresponding to the API request message.

Step S507. Return the API running instance URL to the API caller.

The generating a multi-tenant routing policy table may specifically include: obtaining a corresponding tenant ID based on the APP key, and generating a first mapping table between the APP key and the tenant ID; obtaining the API running instance URL list based on the tenant ID, and generating a second mapping table between the tenant ID and the API running instance URL list; and generating the multi-tenant routing policy table based on the first mapping table and the second mapping table.

Specifically, the obtaining a corresponding tenant ID based on the APP key may include: obtaining the information about the corresponding API caller from an IAM based on the APP key; and determining, based on the information about the API caller, a tenant to which the API caller belongs, and obtaining the tenant ID corresponding to the tenant.

In the API hybrid multi-tenant routing method provided in this embodiment of this application, after determining the API running instance URL corresponding to the API request message, the API gateway returns the API running instance URL to the API caller, to complete API hybrid multi-tenant routing. The API running instance is configured by the API gateway based on information about the tenant. If the tenant to which the API caller belongs is a physical tenant, a private API running instance URL allocated to the physical tenant is returned to the API caller. If the tenant to which the API caller belongs is a logical tenant, a shared API running instance URL allocated to the logical tenant is returned to the API caller. In this way, the API caller can call a correct API running instance by sending the API request message carrying the APP key without a need of obtaining tenant information, thereby implementing adaptive hybrid multi-tenant routing.

Figure 6:
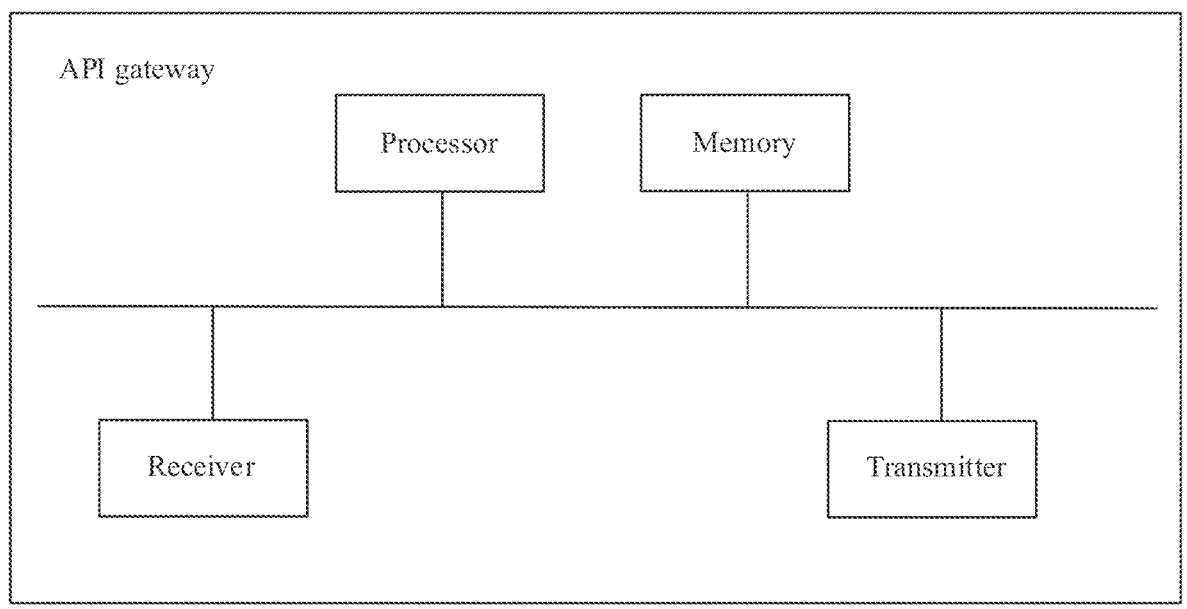
FIG. 6 is a schematic structural diagram of an API gateway according to an embodiment of this application.

FIG. 6 is an API gateway according to an embodiment of this application. The API hybrid multi-tenant routing system provided in the embodiments of this application is a functional module in the API gateway. The API gateway includes a memory, a receiver, a transmitter, and a processor.

The receiver is configured to receive an API request message sent by an API caller, where the API request message carries an APP key, and the APP key is used to identify the API caller.

The processor executes code stored in the memory to: parse the API request message, to obtain the APP key; and obtain, based on the APP key and a multi-tenant routing policy table, an API running instance URL list corresponding to the APP key, where the multi-tenant routing policy table is stored in the memory, and is used to store a mapping relationship between the APP key and the API running instance URL list; and determine, in the API running instance URL list based on a preconfigured API load balancing policy, an API running instance URL corresponding to the API request message.

The transmitter is configured to send the API running instance URL to the API caller.

The processor is further configured to: receive information about the API caller that is transmitted by the API caller or entered by a skilled person, generate the APP key based on the information about the API caller, and store the APP key in the memory, where the APP key is used to uniquely identify the API caller. The transmitter is further configured to send the APP key to the API caller.

The processor is further configured to generate the multi-tenant routing policy table and store the multi-tenant routing policy table in the memory. Specifically, the processor may be configured to: obtain, through query, a corresponding tenant ID from an IAM based on the APP key, generate a first mapping table between the APP key and the tenant ID, and store the first mapping table in the memory; obtain the API running instance URL list from the IAM based on the tenant ID, generate a second mapping table between the tenant ID and the API running instance URL list, and store the second mapping table in the memory; and generate the multi-tenant routing policy table based on the first mapping table and the second mapping table, where the multi-tenant routing policy table may be stored in the memory.

The processor is specifically configured to: obtain the information about the corresponding API caller from the IAM based on the APP key; and determine, based on the information about the API caller, a tenant to which the API caller belongs, and obtain the tenant ID of the tenant.

The processor may be further configured to: generate an API authorization token based on the APP key. The transmitter is further configured to send the API authorization token to the API caller. The receiver is configured to receive the API request message sent by the API caller. The API request message carries the APP key and the API authorization token. The processor is further configured to verify validity of the APP key, and if the APP key is valid, determine, based on the APP key, the API running instance URL to be returned to the API caller. The transmitter is configured to send the API running instance URL to the API caller.

In the prior art, the API caller needs to obtain tenant information, and send a tenant ID and a tenant type to the API gateway to obtain a corresponding API running instance. This is very inconvenient for operation of the API caller, and if incorrect tenant information is obtained, a correct API running instance cannot be called. In the API hybrid multi-tenant routing technical solution provided in this embodiment of this application, the specific APP key is generated for the API caller based on the information about the API caller, where the APP key identifies the API caller. The API caller sends, to the API gateway, the API request message carrying the APP key. The API gateway determines the correct API running instance URL based on the APP key that is in the API request message and returns the correct API running instance URL to the API caller, so that the API caller can call the API running instance corresponding to the API running instance URL. If the API caller belongs to a physical tenant, a private API running instance URL of the physical tenant is returned to the API caller. If the API caller belongs to a logical tenant, a shared API running instance URL of the logical tenant is returned to the API caller. The APP key, the information about the API caller, the information (including the tenant ID) about the tenant to which the API caller belongs may be stored in the IAM. Therefore, the API hybrid multi-tenant routing technical solution provided in this embodiment of this application can implement adaptive routing of the API running instance when the API caller does not need to obtain the tenant information, thereby improving convenience and a success rate of operation of the API caller.

An embodiment of this application further provides a computer readable storage medium, including an instruction. When the instruction is run on a computer, the computer is enabled to perform the function of the API hybrid multi-tenant routing system provided in the embodiments of this application.

An embodiment of this application further provides a computer program product including an instruction. When the computer program product is run on a computer, the computer is enabled to perform the function of the API hybrid multi-tenant routing system provided in the embodiments of this application.

It should be noted that, in this specification, the terms "include", "comprise", or any other variant thereof is intended to cover non-exclusive inclusion, so that a process, method, system, or device that includes a series of elements not only includes those elements but also includes other elements that are not expressly listed, or further includes elements inherent to such a process, method, system, or device. An element limited by "includes a . . . " does not, without more constraints, preclude the presence of additional identical elements in the process, method, system, or device that includes the element.

For same or similar parts in the embodiments in this specification, refer to these embodiments. Particularly, the method and device embodiments are basically similar to the apparatus embodiment, and are relatively briefly described. For related parts, refer to the descriptions of the apparatus embodiment.

What is claimed is:

1. An application programming interface (API) hybrid multi-tenant routing method, comprising:
   receiving, by an API gateway, an API request message sent by an API caller, wherein the API request message carries an application key (APP key), and the APP key is used to identify the API caller;
   obtaining, based on the APP key and a multi-tenant routing policy table, an API running instance URL list corresponding to the APP key, wherein the multi-tenant routing policy table is used to store a mapping relationship between the APP key and the API running instance URL list, the API caller belongs to an API tenant, and an API running instance corresponding to an API running instance URL of the API running instance URL list is configured by the API gateway based on information about the API tenant, wherein if a tenant type of the API tenant is a physical tenant, the API running instance corresponding to the API running instance URL list is an API running instance private to the API tenant, or if a tenant type of the API tenant is a logical tenant, the API running instance corresponding to the API running instance URL list is a shared API running allocated to the API tenant;
   determining, in the API running instance URL list based on a preconfigured API load balancing policy, an API running instance URL corresponding to the API request message; and
   returning the API running instance URL to the API caller,
      wherein before the receiving, by the API gateway, the API request message sent by the API caller, the method further comprises:
      generating the APP key based on information about the API caller, and returning the APP key to the API caller; and
      generating the multi-tenant routing policy table by: obtaining a tenant ID of the API tenant based on the APP key, and generating a first mapping table between the APP key and the tenant ID; obtaining the API running instance URL list based on the tenant ID, and generating a second mapping table between the tenant ID and the API running instance URL list and generating the multi-tenant routing policy table based on the first mapping table and the second mapping table;
      wherein the obtaining the tenant ID of the API tenant based on the APP key comprises: obtaining the information about the corresponding API caller from an identity and access management (IAM) module based on the APP key; and determining, based on the information about the API caller, the API tenant to which the API caller belongs, and obtaining the tenant ID of the API tenant.

2. A non-transitory computer readable storage medium, comprising an instruction, wherein when the instruction is run on a computer, the computer performs the method according to claim 1.

3. An API gateway, comprising a memory, a receiver, a transmitter, and a processor, wherein:
   the receiver is configured to receive an API request message sent by an API caller, wherein the API request message carries an APP key, and the APP key is used to identify the API caller;
   the processor is configured to execute code stored in the memory to:
   obtain, based on the APP key and a multi-tenant routing policy table, an API running instance URL list corresponding to the APP key, wherein the multi-tenant routing policy table is stored in the memory, and is used to store a mapping relationship between the APP key and the API running instance URL list, the API caller belongs to an API tenant, and an API running instance corresponding to an API running instance URL of the API running instance URL list is configured by the API gateway based on information about the API tenant, wherein if a tenant type of the API tenant is a physical tenant, the API running instance corresponding to the API running instance URL list is an API running instance private to the API tenant, or if a tenant type of the API tenant is a logical tenant, the API running instance corresponding to the API running instance URL list is a shared API running allocated to the API tenant; and determine, in the API running instance URL list based on a preconfigured API load balancing policy, an API running instance URL corresponding to the API request message; and the transmitter is configured to return the API running instance URL to the API caller, wherein before the receiver is configured to receive the API request message, the processor is further configured to:

generate the APP key based on information about the API caller, and return the APP key to the API caller; and generate the multi-tenant routing policy table and store the multi-tenant routing policy table in the memory, wherein the generating the multi-tenant routing policy table comprises: obtaining a tenant ID of the API tenant based on the APP key, and generating a first mapping table between the APP key and the tenant ID; obtaining the API running instance URL list based on the tenant ID, and generating a second mapping table between the tenant ID and the API running instance URL list and generating the multi-tenant routing policy table based on the first mapping table and the second mapping table, wherein the processor is specifically configured to:

obtain the information about the corresponding API caller from an identity and access management (IAM) module based on the APP key; and determine, based on the information about the API caller, the API tenant to which the API caller belongs, and obtain the tenant ID of the API tenant.

* * * * *

UNITED STATES PATENT AND TRADEMARK OFFICE
CERTIFICATE OF CORRECTION

| | | |
|---|---|---|
| PATENT NO. | : 11,272,036 B2 | Page 1 of 1 |
| APPLICATION NO. | : 16/831314 | |
| DATED | : March 8, 2022 | |
| INVENTOR(S) | : Li | |

It is certified that error appears in the above-identified patent and that said Letters Patent is hereby corrected as shown below:

In the Claims

Claim 3: Column 16, Line 7: "tenant ID and the API running instance URL list" should read -- tenant ID and the API running instance URL list; --.

Signed and Sealed this
Nineteenth Day of July, 2022

Katherine Kelly Vidal
*Director of the United States Patent and Trademark Office*